United States Patent [19]

Katoh

[11] Patent Number: 5,518,332

[45] Date of Patent: May 21, 1996

[54] END PLATE WITH CLIP

[75] Inventor: Hajime Katoh, Hyogo, Japan

[73] Assignee: Nippon Cable System Inc., Hyogo, Japan

[21] Appl. No.: 351,188

[22] Filed: Nov. 30, 1994

[30] Foreign Application Priority Data

Nov. 30, 1993 [JP] Japan .................... 5-330031

[51] Int. Cl.⁶ .................................................. F16B 21/18
[52] U.S. Cl. .................... 403/155; 285/305; 74/502.4; 74/502.6
[58] Field of Search ............................. 74/502.4, 502.6, 74/500.5, 501.6; 403/155, 70; 285/305

[56] References Cited

U.S. PATENT DOCUMENTS

| | | | |
|---|---|---|---|
| 3,471,186 | 10/1969 | Luebbert et al. | 285/305 X |
| 4,075,904 | 2/1978 | Irwin et al. | 74/502.4 |
| 4,327,600 | 5/1982 | Bennett | 74/502.4 |
| 4,657,212 | 4/1987 | Gilmore et al. | 74/502.4 X |
| 4,697,948 | 10/1987 | Fukuda | 403/155 X |
| 4,733,987 | 3/1988 | Tomlinson et al. | 285/305 X |
| 4,865,504 | 9/1989 | Kaimo | 403/155 X |
| 4,947,704 | 8/1990 | Gokee | 74/502.4 |
| 5,000,614 | 3/1991 | Walker et al. | 285/305 X |
| 5,048,996 | 9/1991 | DuBois et al. | 403/155 X |
| 5,131,785 | 7/1992 | Shimazaki | 403/155 X |
| 5,152,555 | 10/1992 | Szabo | 285/305 X |
| 5,265,495 | 11/1993 | Bung et al. | 74/502.4 X |
| 5,269,571 | 12/1993 | Haggard | 285/305 |
| 5,347,882 | 9/1994 | Klotz | 74/502.4 |

FOREIGN PATENT DOCUMENTS

| | | |
|---|---|---|
| 61-28911 | 2/1986 | Japan . |
| 61-130609 | 6/1986 | Japan . |
| 2-18342 | 5/1990 | Japan . |

*Primary Examiner*—Dave W. Arola
*Assistant Examiner*—Christopher J. Novosad
*Attorney, Agent, or Firm*—Lowe, Price, LeBlanc & Becker

[57] ABSTRACT

An end plate with clip (1) which has a main body (2) and a clip (3). The main body (2) has a disk-like base plate (7) having a center hole, a tubular supporting portion (8), a bush (9), and a projection (13) having an engaging groove for engaging the clip (3). The clip (3) is made of a three-dimensionally bent metal wire.

10 Claims, 9 Drawing Sheets

END PLATE WITH CLIP

BACKGROUND OF THE INVENTION

The present invention relates to a shaft end washer or end plate with clip and a connecting assembly using the same. The invention specifically relates to a shaft end washer or end plate with clip to hold an eye-rod connected to an inner cable of a control cable or Bowden cable, such that the eye-rod is rotatably mounted on a shaft member and is not slipped out of the shaft.

A generally used cable end connecting assembly comprises, for example as shown in FIG. 9, an eye-rod 104 having a rod 102 connected to an inner cable 101 of a control cable and a ring portion 103 fixed to an end of the rod 102, a lever 106 having a shaft member 105 for rotatably supporting the ring portion 103, and a washer 107 or shaft end washer or end plate. The washer 107 is engaged with so called "beta-pin" 109 having a shape like a Greece alphabet "β". That is to say, a straight portion of the beta pin 109 is inserted through a pin-hole 108 which is formed in the shaft end in the radial direction, and a curved portion is engaged with the outer surface of the shaft. As stopper or checker, E-type snap ring or C-type snap ring is engaged in a circular groove formed in the shaft end. Further, a split pin or doll pin has been also used as stopper. In FIG. 9, numeral 110 denotes an isolation damper and 103 denotes a bush.

That is to say, the above mentioned washer 107 and beta-pin 109 are used for holding the rotational member having the isolation damper 110 with permitting rotation. However, the beta-pin 109 and another snap rings are small and troublesome to treat. Further some suitable tools are necessary for attaching them. Therefore, when those beta-pin and snap rings are inserted and fixed to a shaft in an engine room of an automobile or under floor space of cars, such works are very troublesome.

Therefore, there has been proposed an cable-end-assembly having a washer, a snap-ring integrated to the washer and an isolation damper previously engaged with the washer (see Japanese U.M. Publication No. Jitsu-Ko-Hei 2-18342).

However, in the cable-end-assembly, the washer is weak in holding function since the washer supports merely circumference of the rotational member. Further the washer tends to lean with respect to the axis and is weak in a function to hold right angle.

On the other hand, there has been known another cable-end-assembly in which a washer plate and a bush are integratedly as a single member and engaging claws for snap-joint with isolation damper are provided, (see Japanese U.M. Publication No. Jitsu-Kai-Sho 61-28911). Though this assembly has high capacity to keep right angle, the assembly do not have stopper function. Therefore, a stopper member such as a split pin is necessary, and a tool is also necessary when it is attached on a shaft.

Further, another cable-end-assembly has been proposed, in which a shaft-end-washer and an engaging portion for checking shaft are integratedly molded out of synthetic resin (see Japanese patent publication No. Toku-Kai-Sho 61-130609, or U.S. Pat. No. 4,947,704). However, such synthetic resin engaging portion is weak in checking function, i.e. holding and engaging function in the axial direction.

The main object of the present invention is to provide an end plate with a clip which uses no separate checking means such as the beta-pin, which can securely keep right angle and has high checking function, and which can be easily attached to a shaft member with no tool.

Another object of the present invention is to provide a connecting assembly which can be easily assembled.

SUMMARY OF THE INVENTION

According to the present invention, there is provided an end plate with clip comprising a main body and a clip. The main body has a base plate with a center hole for receiving an end of a shaft and a tubular supporting portion projecting from a rim of the center hole. The supporting portion has an inner hall for receiving the shaft end and a slit at a lower portion thereof. The slit is arranged parallel with the base plate and reaches the inner hole. The clip is made of a metal wire and has a holding portion to be supported on the main body and an inserting portion to be inserted into the slit at a free end thereof.

In the above mentioned end plate, it is preferable to form a pair of slits at both side of the supporting portion with respect to an axis thereof, and to provide a pair of inserting portions to be inserted into the pair of slits. Further, the clip has preferably a U-shaped form having the pair of inserting portions and a connecting portion connecting the pair of inserting portions. The center of the connecting portion is a holding portion to be supported on the base plate. Further the connecting portion of the clip has preferably a U-shaped form, and each inserting portion is preferably made by bending a free end of the connecting portion inside back.

The base plate is preferably provided with a projecting portion formed with an engaging groove for engaging the center of the connecting portion of the clip. Further, it is preferable that the slit in the main body is positioned with distance from an upper surface of the base plate, so that the inserting portion is inserted into the slit as the connecting portion of the clip is elastically abutted against the upper surface of the base plate.

In the above mentioned end plate, the main body preferably has a bush for receiving the shaft, situated under the base plate such that the bush is concentric with the supporting portion. It is further preferable that the main body and the bush are integratedly made of synthetic resin.

Further, according to the present invention, there is provided a connecting assembly having a shaft member having a tapered free end and an engaging groove, a rotary member provided on the shaft member, and the end plate with clip, wherein the inserting portion of the clip is engaged with the engaging groove of the shaft member.

In the above connecting assembly, it is preferable that the main body has a bush situated under the base plate such that the bush is concentric with the supporting portion, and the bush is interposed between the shaft member and the rotary member. Further, the bush preferably has a flange at a bottom thereof, and the bottom engages with a bottom end of the rotary member. The rotary member might be an eye-rod having a ring portion and a rod portion connected to a control cable. In the connecting assembly, a damper is preferably interposed between an inner face of the ring portion and the shaft member. Hereinafter, the function of the end plate is explained.

The end plate with clip of the present invention can be treated as single member, since the clip is connected to the main body. Further, since the main body has a tubular supporting portion to be fitly mounted on the shaft end, the right angle between main body and the shaft can be securely kept. Since the slit reaches the inner hole of the tubular supporting portion, the inserting portion of the clip projects in the inner hole of the main body. When a shaft member which has a tapered free end is inserted into the inner hole of the end plate, the inserting portion of the clip is elastically deflected outward against urging force thereof, since the tapered face of the shaft end abuts against the inserting portion of the clip. And when the shaft is inserted at all, the inserting portion of the clip engages with the shaft end, for example, with a circular engaging groove.

After the engagement, the inserting portion is securely supported by the supporting portion so as not to move in the axial direction, and the clip receives merely shearing stress and receives bending moment little.

The shearing stress rises at two end portions of the slits. Therefore, the clip which is made of a metal wire can perform good retaining function. When the end plate is removed, the inserting portion of the clip is elastically deflected outward to disengage from the shaft, and then, the end plate can be removed in the axial direction from the shaft.

When a pair of slits are formed in the above mentioned end plate, and a pair of inserting portions to be inserted in the respective slit are formed, resistance against shearing stress increases.

Further, when the clip is formed in to substantially U-shape having a pair of inserting portions and a connecting portion connecting the inserting portions each other, and the center portion of the connecting portion is fixed on the base plate, the clip can be arranged in the area of the base plate so that the end plate can be easily treated. When the connecting portion has substantially U-shaped form, and each inserting portion is made by bending a free end of the connecting portion inside back, the inserting portion can be easily inserted and removed since the inserting portions can deflect resiliently large. Further, when the base plate is provided with a projection having an engaging groove for receiving the center of connecting portion of the clip, the clip can be easily assembled by engaging the connecting portion of the clip to the engaging groove and then inserting the inserting portions into the slits.

When the slit is positioned at a height with distance from an upper surface of the base plate, the connecting portion of the clip is elastically abutted against the upper surface of the base plate, and the inserting portion is inserted into the slit at the position with distance from the upper surface of the base plate, the clip can be securely engaged to the main body due to the resilient force of the clip itself.

In another preferable embodiment of the end plate having a bush under the base plate in concentric relation with the supporting portion, the angle between the base plate and the shaft can be securely kept in right angle. Further rotary friction of a rotary member to be mounted on the shaft can be reduced, and the parts can be integrated. In this case, the bush and the main body can be molded by synthetic resin into an integrated body, and can be easily manufactured.

The connecting assembly of the present invention performs the above mentioned all functions since the assembly includes a shaft member, a rotary member and the above mentioned end plate to be attached on the end of the shaft. That is to say, the rotary member can be securely held without being tightly fastened.

Further, the connecting assembly can be easily assembled, since the shaft end is tapered and the taper face is abutted against the inserted portion of the clip so as to automatically expand. When a bush is provided under the base plate of the shaft end plate so that the bush is concentric with the supporting portion, and the bush is interposed between the shaft and the rotary member, the angle between the base plate and the shaft can be securely kept in right angle, and the assembly can be easily treated since the end plate can be previously jointed to the rotary member.

The cable-end connecting assembly of the present invention has a construction that the above mentioned assembly is applied to a structure for jointing the cable-end rod of a control cable to a shaft member of another apparatus, and the cable-end assembly can perform the above mentioned functions. When an isolation damper is interposed between a ring portion of the eye-rod and the shaft member, the ring member becomes large and heavy. However, by virtue of the end plate, the right angle can be securely kept, the checking force can be increased, and assembling is easy.

Hereinafter, some embodiments of the end plate with clip (hereinafter referred to as "end plate") are explained with reference to the attached drawings.

DETAILED DESCRIPTION OF THE INVENTION

Figure 1:
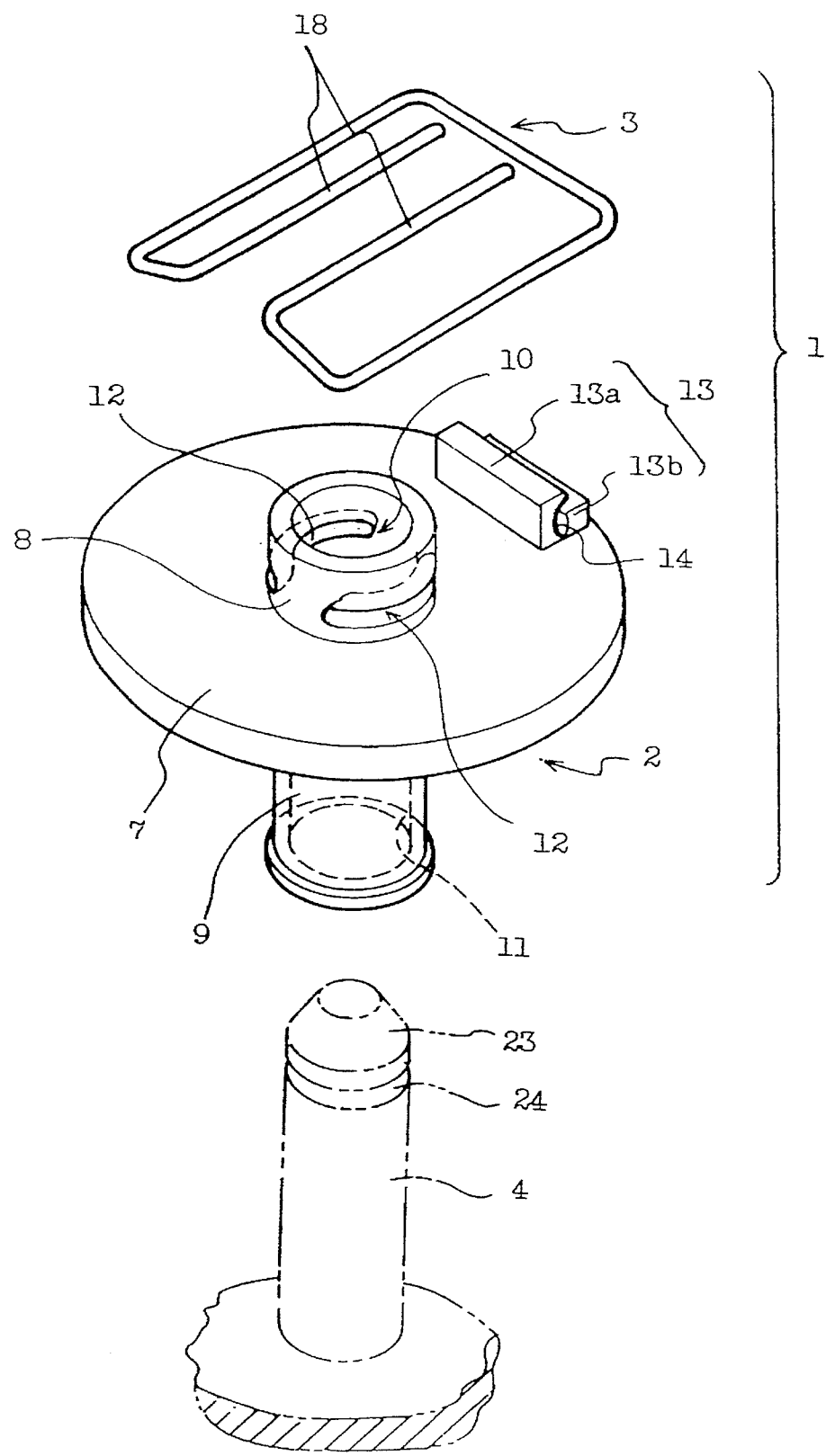
FIG. 1 is a perspective view showing an embodiment of the end plate of the present invention in pre-assembly state.

Referring to FIG. 1, an end plate 1 has a main body 2 and a clip 3 to be attached to the main body 2. Numeral 4 denotes a shaft to which the end plate 1 is mounted. The main body 2 has a disk-like base plate 7 having a center hole (6 in FIG. 2), and a tubular supporting portion 8 standing on the base plate 7 at the rim of the center hole 6. Further, in this embodiment, the main body 2 has a bush 9 under the base plate 7 concentrically with the supporting portion 8. The inner hole 10 of the supporting portion 8 and the inner hole 11 of the bush 9 have the same diameter, and those holes 6, 10, 11 can fitly receive the shaft 4. In another embodiment, the bush 9 can be separated from the base plate 7, and further the bush 9 can be omitted in some cases. Further, diameter of the inner hole 10 of the supporting portion 8 might be smaller than diameter of the hole 11 of the bush 9. In this case, the shaft 4 is formed with stepped portion so as to fit those holes 10, 11. Thickness of the supporting portion 8 is somewhat larger than thickness of the bush 9. The supporting portion 8 is provided with a pair of slits 12 at left and right sides at the root portion thereof. The slits 12 are parallel with the base plate 7 and perpendicular with an axis of the supporting portion 8. The slits 12 reach to inner hole 10 as clearly shown in FIG. 2. The depth D of the slit 12 is preferably such depth that the clip 3 can be fully inserted into the inner hole 10. The bottoms of each slits 12, i.e. the most deep portions of the slit 12, are arranged as a straight line so as to receive the straight portion of the clip 3, and the pair of bottoms of the slits 12 are arranged parallel each other.

The base plate 7 is provided with a projection 13 at the upper surface, and the projection 13 is perpendicular to the slits 12. The projection 13 is formed with an engaging groove 14 which reaches the upper surface of the base plate 7 and extends through the full width of the projection 13. Therefore, the projection 13 is separated to an inside part 13a and an outside part 13b.

Figure 4:
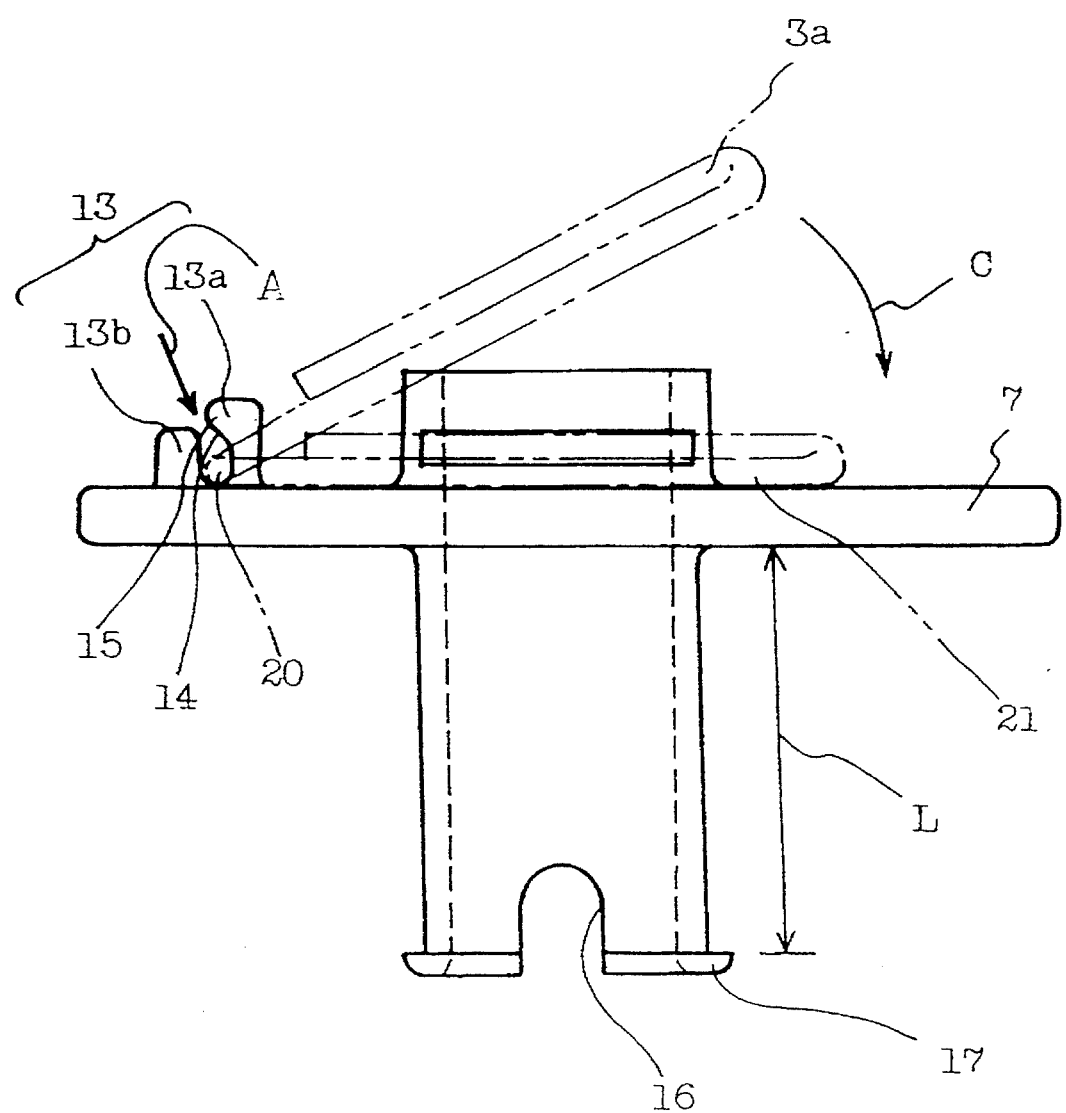
FIG. 4 is a side view of the end plate of FIG. 1.

Further as shown in FIG. 4, the inside part 13a of the projection 13 is provided with a hook portion 15 projecting toward the outside part 13b. The bush 9 has a pair of U-shaped cut portions 16 at the bottom end, and the bottom end of the bush 9 is flared to form a flange 17. The distance L between the base plate 7 and flange 17 is such dimension that rotary member (30 in FIG. 5) can be rotatably mounted without being clamped tightly in the axial direction. The main body 2 including the base plate 7, supporting portion 8 and the bush 9 can be integratedly made by molding synthetic resin having high strength and high slideability, such as polyacetal resin, polyamide resin, polybutylene terephthalate resin. If further strength is desired, fiber reinforced resin (FRP), e.g. a glass fiber reinforced resin can be used. Oil containing resin is also preferably used, so as to obtain good slideability.

Figure 2:
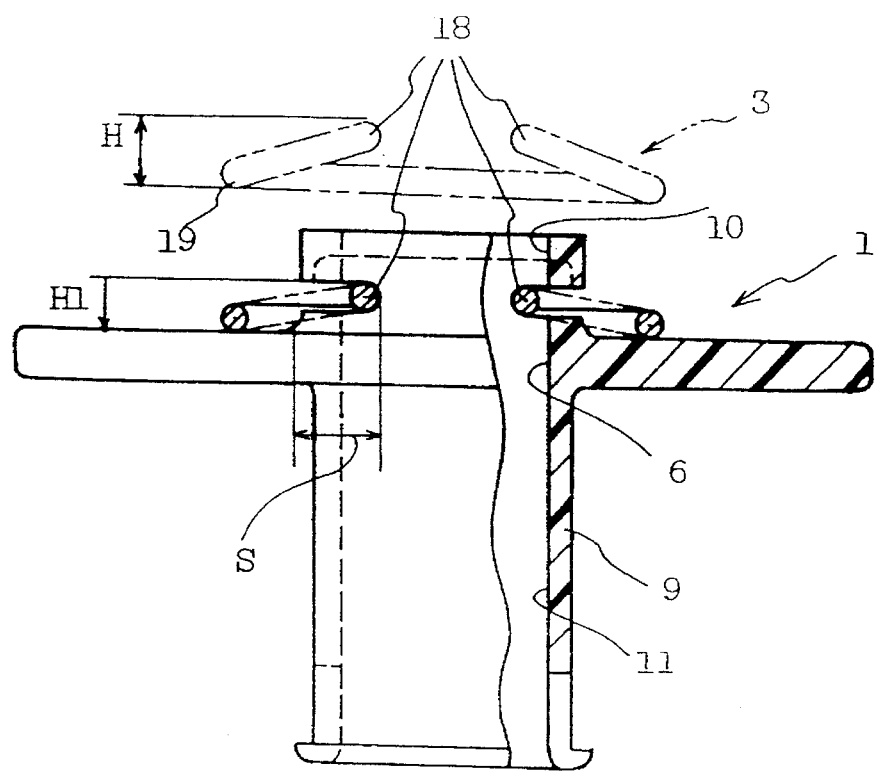
FIG. 2 is a partially-cut-off front view of the end plate of FIG. 1.
Figure 2:
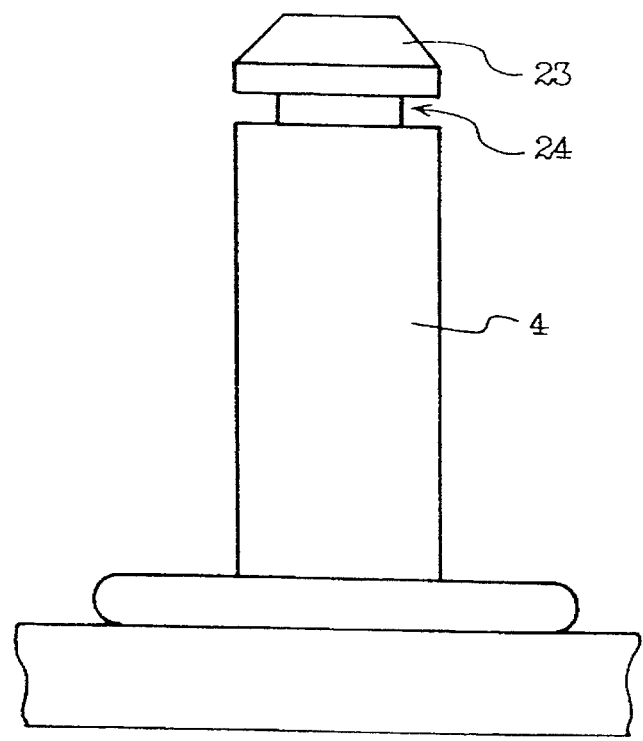

Referring to FIG. 2, the clip 3 is made by bending a metal wire in generally U-shaped form. The metal wire might be a stainless steel wire, a piano wire, a spring steel wire, and the like. The clip 3 has a pair of inserting portions 18 to be inserted in the slits 12 and a connecting portions 19 connecting the inserting portions 18 each other. The connecting portion 19 has a lateral portion 20 and a pair of longitudinal portions 21 extending from both ends of the lateral portion 20 with right angle to form a U-shape. However, as another embodiment, the lateral portion might be a straight line. Each inserting portion 18 extends back from the fore end of the longitudinal portion through a curved portion 22 which connects the inserting portion 18 to the longitudinal portion. As shown by imaginary line in FIG. 2, the curved portion 22 is inclined upward so that the inserting portion 18 floats by a height H. The height dimension of H is larger than the corresponding height dimension H1 between the upper surface of the base plate 7 and the slit 12.

The above mentioned main body 2 and the clip 12 are assembled as following. That is to say, at first, as shown in FIG. 4 by imaginary lines, the lateral portion 20 of the clip 12 is inserted into the engaging groove 14 of the projection 13 as shown by arrow A. The gap of the upper side of the engaging groove 14, i.e. the gap between the inside portion 13a and the outside portion 13b is narrowed by the hook portion 15. The dimension of the gap is preferable slightly smaller than the diameter of wire of the clip 3 such that the clip 3 do not slip out of the engaging groove 14 easily.

Figure 3:
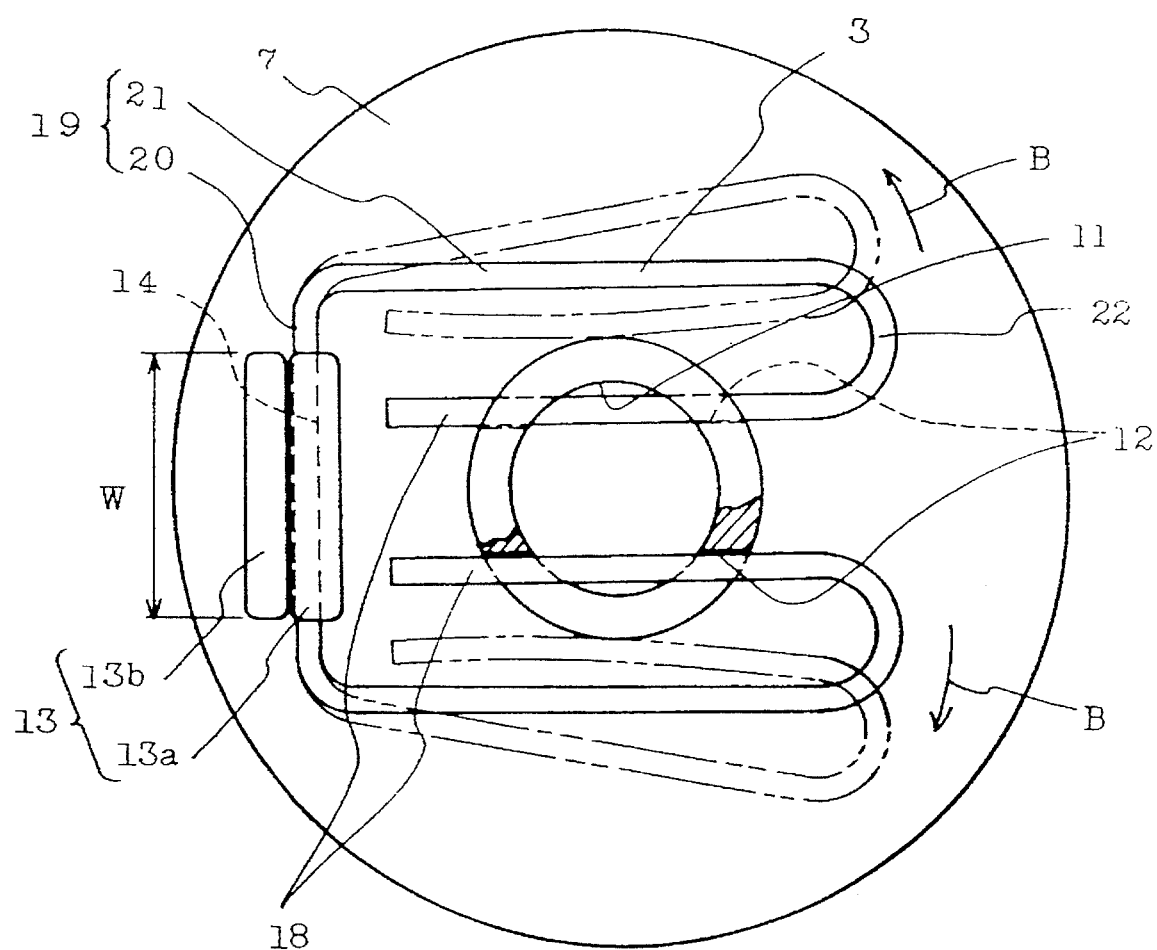
FIG. 3 is a partially-cut-off plan view of the end plate of FIG. 1.

Next, as expanding the inserting portions 18 and the longitudinal portions 21 outwardly as shown by arrow B and imaginary line in FIG. 3, the clip 3 is rotated down as shown by arrow C in FIG. 4. Then the longitudinal portions 21 are abutted against the surface of the base plate 7, and the inserting portions 18 are abutted against the outer surface of the supporting portion 8 at both sides. Further, the inserting portions 18 are depressed downward and are inserted into the slits 12 with resilient force thereof.

Under the situation, since the floating dimension H between the inserting portion 18 and the connecting portion 19 is larger than the dimension H1 between the slit 12 and the upper surface of the base plate 7, the clip 3 is attached with remaining torsional deflection at the curved portion 22. Therefore, the clip 3 can be securely attached to the main body by means of resilient force of itself. In this state, the inserting portions 18 are securely abutted against the bottoms of the slits 12 with resilient force of itself, respectively. Thus, an end plate with clip 1 can be assembled.

The assembled end plate 1 can be easily treated as if it is one member, since the main body 2 and the clip 3 are securely jointed by means of resilient force of the clip 3. Further, since the clip 3 is made of a metal wire, the clip 3 can be securely engaged with a shaft member 4, and the retaining force is strong. In the embodiment shown in FIG. 3, the width W of the projection 13 is shorter than the length of the lateral portion 20. Therefore, the inserting portions 18 can be inserted one by one. That is to say, the clip 3 is shifted upward (in FIG. 3) at first, then the upper inserting portion 18 can be easily inserted into the corresponding slit 12, and thereafter, the lower (in FIG. 3) inserting portion 18 can be inserted into the lower side slit 12.

Figure 5A:
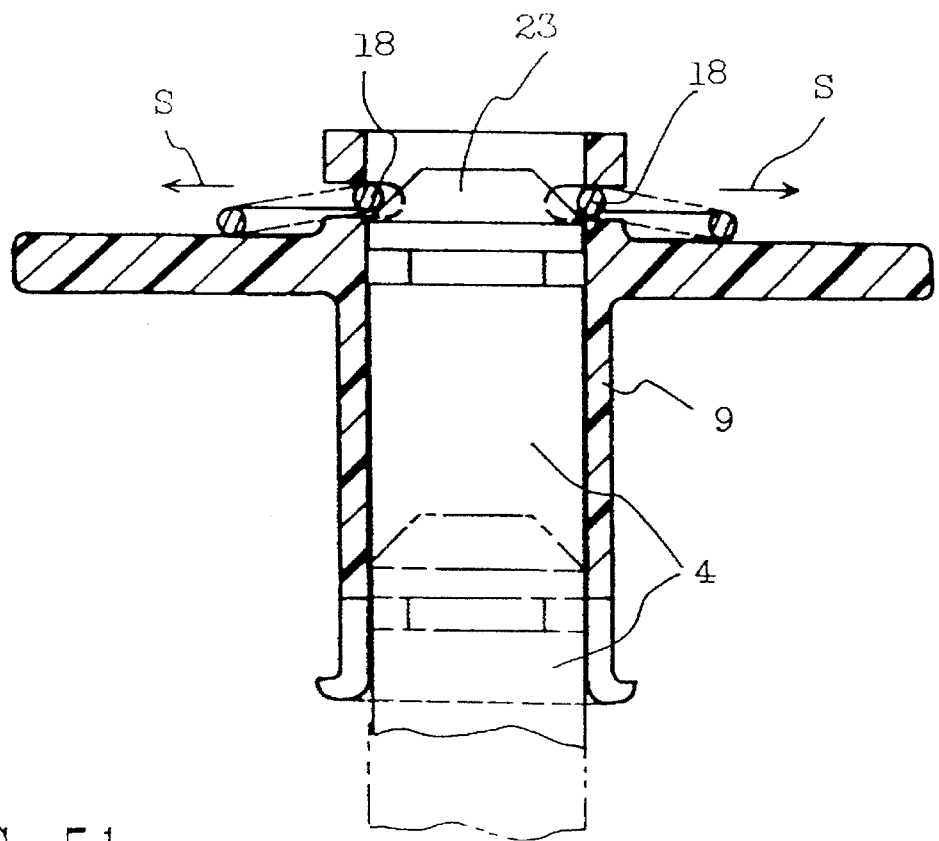
FIG. 5a and FIG. 5b are sectional views showing the end plate in half assembled state and after assembly, respectively.
Figure 5B:
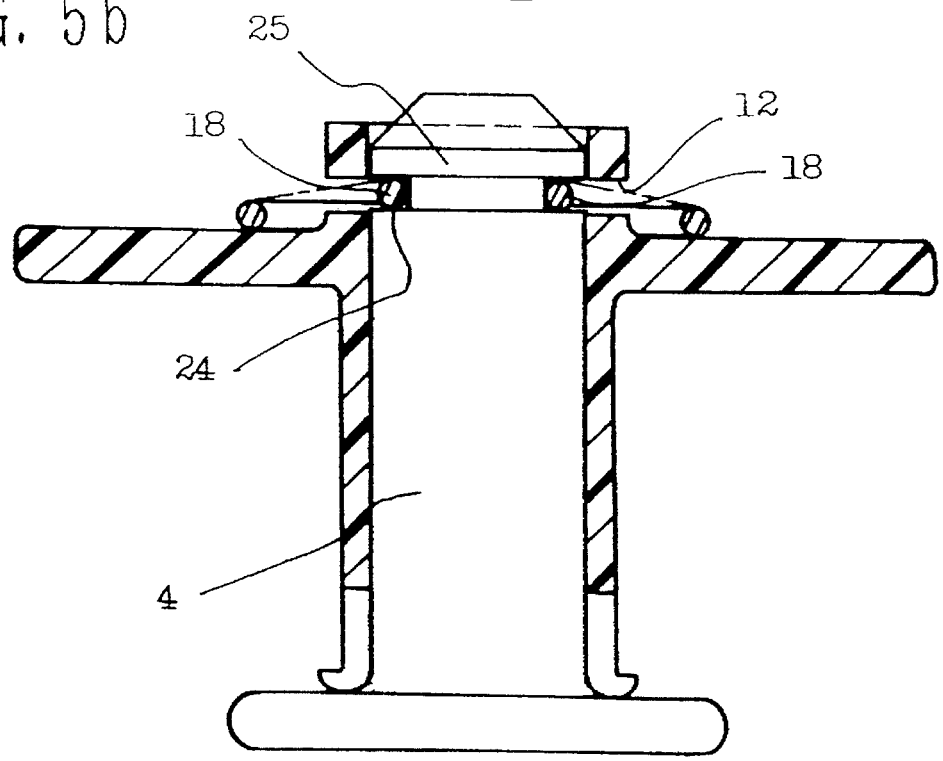
Figure 6:
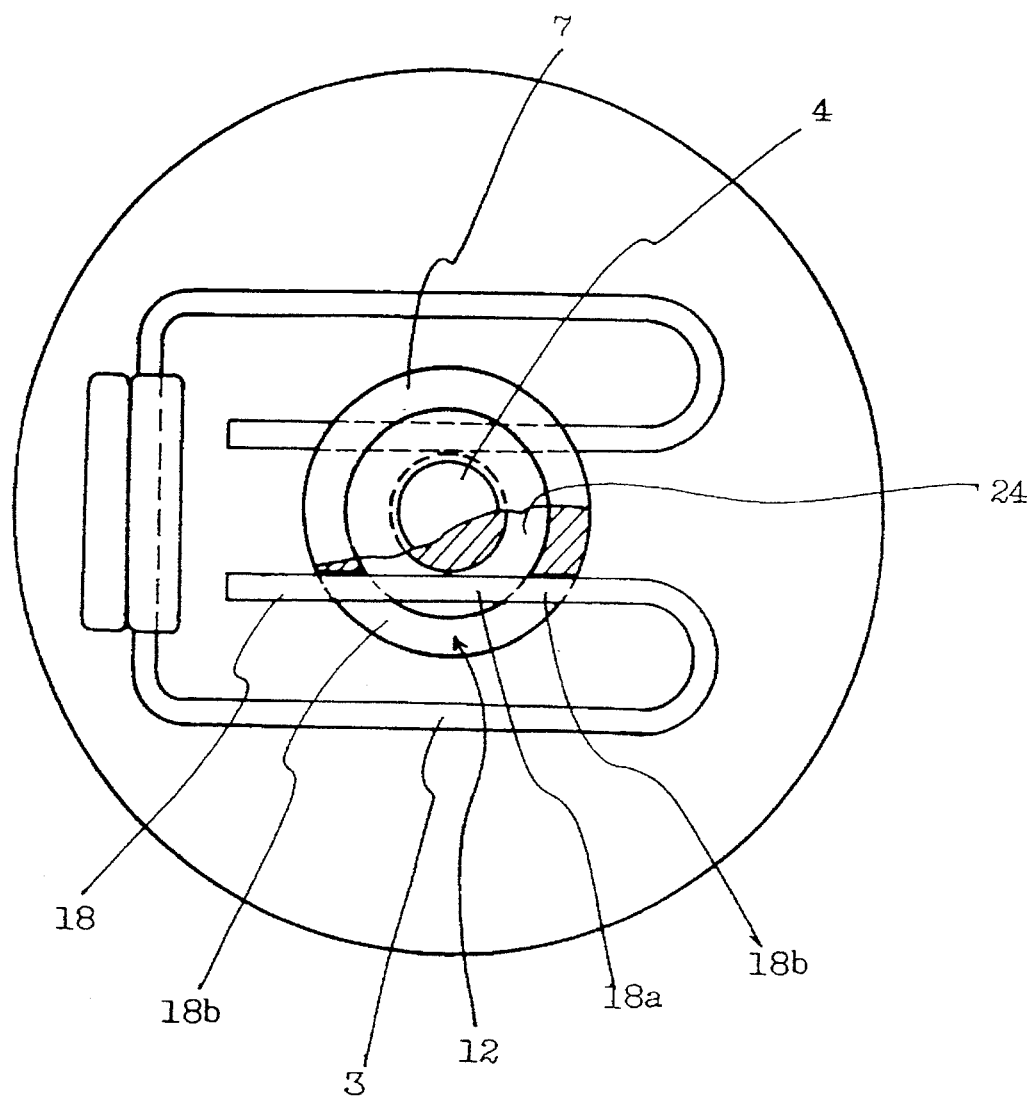
FIG. 6 is a partially-cut-off plan view of the end plate of FIG. 1 which is connected to a shaft member.

Referring to FIG. 2, FIG. 5 and FIG. 6, procedure of using the above mentioned end plate 1 is explained hereinafter. The end plate 1 is mounted on the shaft member 4 having a taper or conical surface 23 and an annular engaging groove 24. That is to say, as shown in FIG. 2, the upper end of the shaft is inserted through the lower aperture of the bush 9. On the way, as shown in FIG. 5a, when the taper surface 23 abuts against the inserting portions 18 of the clip 3, the inserting portions 18 are laterally expanded (see arrow S) on both sides. Then, not only the inserting portions 18, but also the longitudinal portions 21 of the connecting portion 19 deflect laterally. However, the inserting portions 18 do not slip out of the slits 12 and remain to engage with the supporting portion 8. When the top portion 25 of the shaft member 4 passes through the inserting portions 18 of clip in the slits 12, the inserting portions come into the engaging groove 24 to engage with the engaging groove 24 as shown in FIG. 5b and FIG. 6. Then, the end plate 1 is attached on the end of the shaft member 4. At this state, the perpendicularity of the base plate 7 to the shaft member 4 can be securely kept.

As shown in FIG. 6, each inserting portion 18 engages with the shaft member 4 at the center portion 18a and engages with the supporting portion 8 at outer two portions 18b. Therefore, when the base plate 7 receives an axial pulling force, the pair of inserting portions 18 endure against shearing stress at total four points. Therefore, strength of the clip 3 against slipping out is high.

Figure 7:
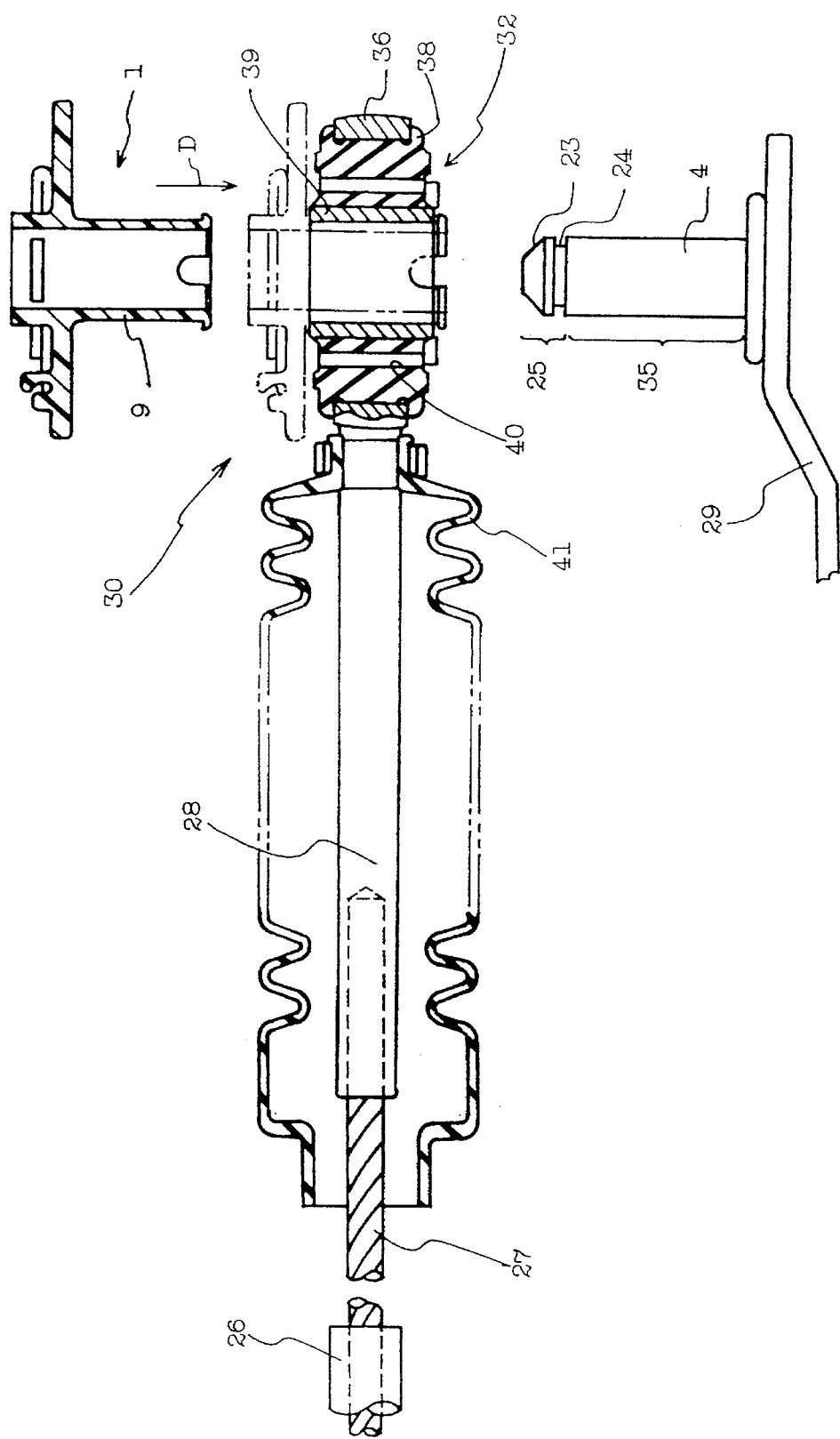
FIG. 7 is a sectional view showing a main part of an embodiment of a shaft end connection assembly of a control cable in pre-assembled state.
Figure 8:
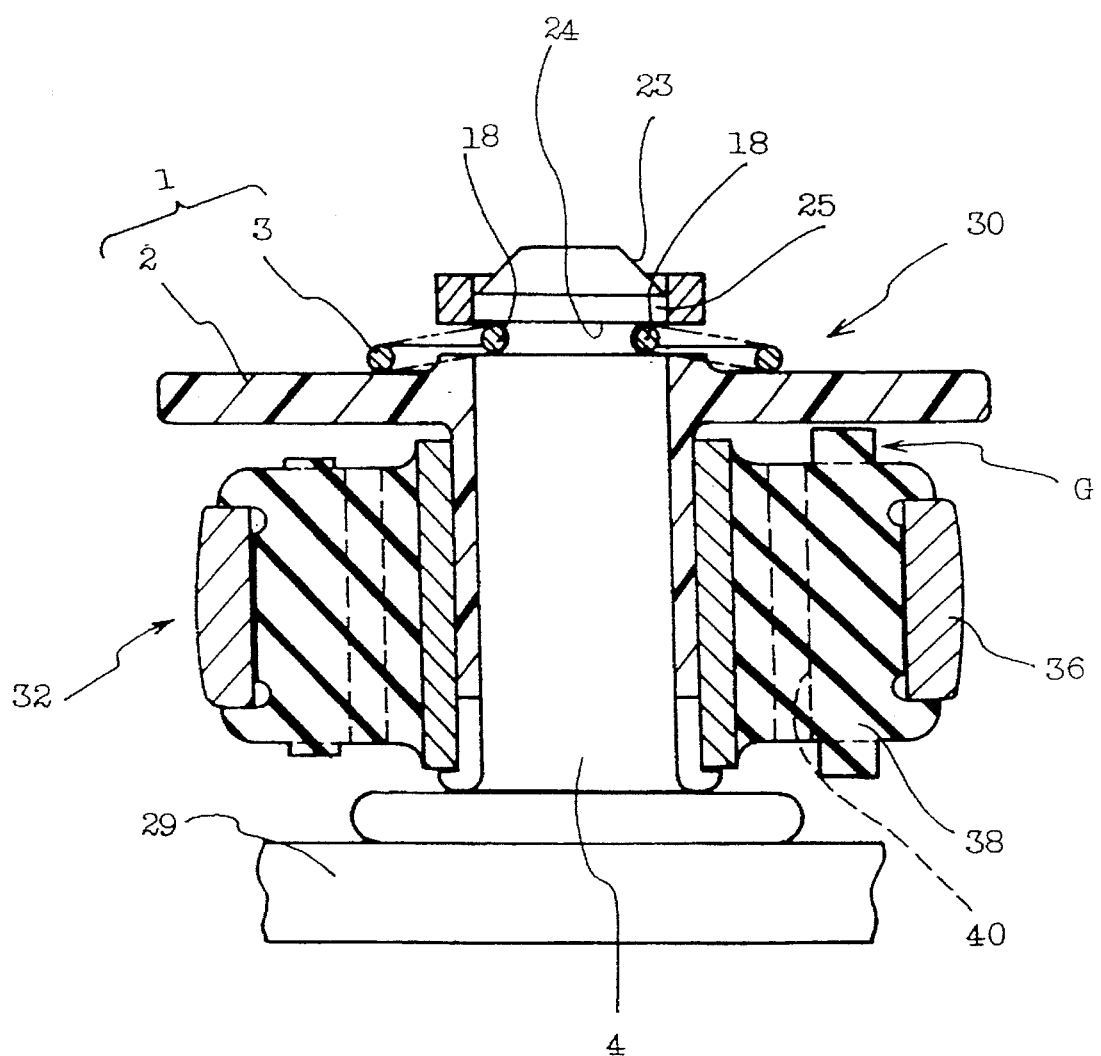
FIG. 8 is a sectional view of the shaft end connection of FIG. 7 in assembly state.
Figure 9:
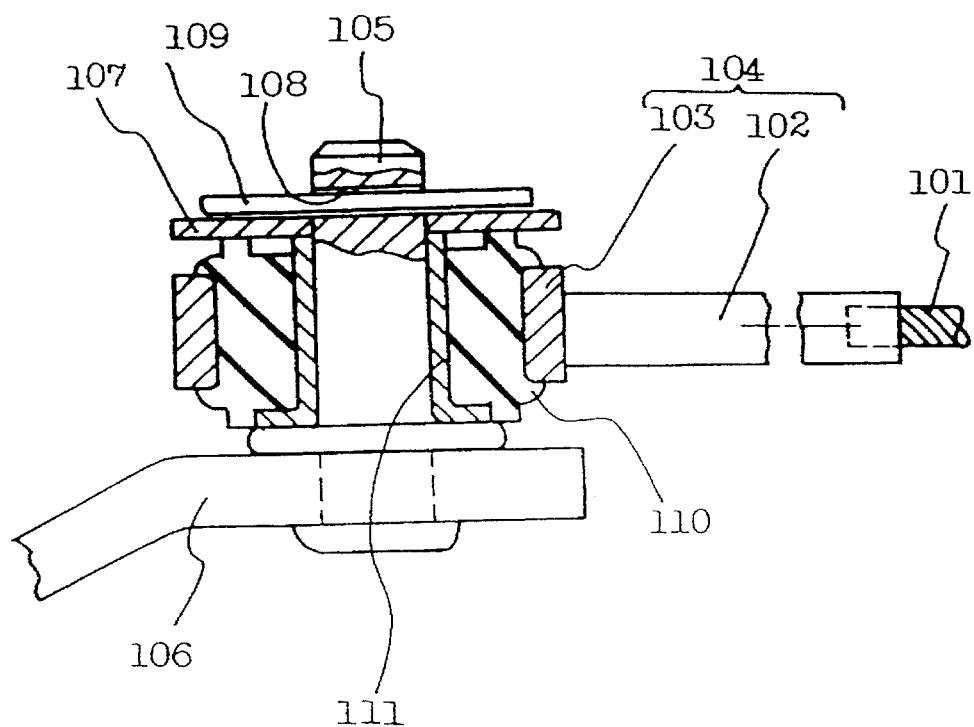
FIG. 9 depicts a conventional cable end connecting assembly to which the invention pertains.

Referring to FIG. 7 and FIG. 8, the connecting assembly 30 has a shaft member 4, a rotary member 32 rotatably mounted on the shaft member 4, and an end plate 1. The shaft member 4 is fixed on a lever 29 for changing transmission in an automobile, at an end thereof, in a state of cantilever. As clearly shown in FIG. 7 which shows a pre-assemble state, the end of shaft member 4 has a taper face 23, and has an annular engaging groove 24 at a position near the end face. Though a portion 25 between the engaging groove 24 and the end face of the shaft member 4 has the same diameter as the root portion 35 in FIG. 7, the portion 25 might be slender than the root portion 35. The position of the engaging groove 24 is preferably determined such that some gap G is provided between the end plate 1 and the rotary member 32 when the rotary member 32 and the end plate 1 are mounted on the shaft member 4.

The rotary member 32 has an eye-rod 28 to be connected to an inner cable 27 of a control cable 26 for operation of transmission changing, a ring-shaped isolation damper or insulation damper 38 closely inserted in the ring portion 36 of the eye-rod 28 and a spacer or inner tube or sleeve 39 which is integrated in the insulation damper by, for example, baking. The insulation damper 38 is made of elastic organic molecular compound or elastomer, such as ethylene propylene rubber, chloroprene rubber, natural rubber, and the like. The insulation damper 38 of FIG. 7 has two slits 40 which pass through from the upper surface to the lower surface thereof. Each slit 40 is arch in sectional shape, and a pair of slits are arranged so as to enclose the sleeve 39. The arch shape of the slit 40 is 120° in angle. Oscillations in the axial direction of the eye-rod 28 can be absorbed by means of the slits 40. The numeral 71 in FIG. 7 denotes bellows.

The ring portion 36 and the isolation damper 38 are previously assembled into a rotary member 32 as shown in FIG. 7. The main body 2 and the clip 3 are also assembled into a state of end plate 1 mentioned in FIG. 1. Then, the end plate 1 is attached to the assembled rotary member 32 as shown by arrow D and imaginary line in FIG. 7. The sleeve 39 is somewhat shorter than the bush 9, i.e. distance between the lower face of the base plate 7 and the upper face of the flange 17. The fit between the inner surface of the sleeve 39 and the outer surface of the bush 9 is slide fit.

Next, the jointed rotary member 32 and the end plate 1 are mounted on the shaft member 4 from the under portion of the bush 9 to engage the end portion of the shaft member 4 to the pair of inserting portions 18 of the clip 3 as shown in FIG. 8. Thus the connection assembly is perfected. The procedure of the engagement of the clip 3 to the end portion of the shaft member 4 is the same as the procedure mentioned in FIGS. 5 and 6. That is to say, as the taper face 23 abutting against the inserting portions 18, the inserting portions 18 expand to both outer sides. And the inserting portions 18 are inserted into the engaging groove after the inserting portions 18 have got over the top portion 25 of the shaft member 4. As mentioned above, joint of the eye-rod 28 to the shaft member 4 can be perfected by easy work without any tool.

After the joint of the eye-rod 28, the end plate 1 is fixed to the shaft member 4, and the rotary member 32 can rotates around an axis of the shaft member 4, due to the slide motion of the inner surface of the bush 9 on the shaft member 4. When the end plate 1 is to be detached from the shaft member 4, the free ends of the inserting portions 18 of the clip 3 or the like are nipped with fingers or tools to deflect elastically outward. Then the connecting portion 19 or the like deflects elastically, and the inserting portions 18 are disengaged from the engaging groove 24. Therefore, the rotary member and the end plate 1 can be pulled out from the shaft member 4. The inserting portions 18 are preferably held in the slits 12 so as to keep engagement with the supporting portion 8. Then the inserting portions 18 can elastically engage with the slits 12 again, and the single member-like assembly of the clip 3 and main body 2 can be kept conveniently.

The above mentioned joint assembly of control cable rod end can perform the same function as the conventional assembly. Further, since the eye-rod 28 and the shaft member 4 of the lever 19 are jointed with the connecting assembly 30 of the present invention, the assembling/disassembling works are easy. By virtue of the isolation damper 38, oscillations from engine or car body can be checked from transmission to the inner cable 25 or control cable 26.

In the above mentioned embodiment, the main body 2 is generally made integratedly. However, the main body 2 might be assembled from a base plate, a supporting portion 8 and a bush 9 which are separate each other. Though a pair of slits 12 and a pair of inserting portions 18 are employed in the above mentioned embodiment, only one set of slit and inserting portion might be employed if large checking force from slip out is not necessary. Though, in the embodiment shown in FIG. 3 or the like, the longitudinal portions 19 of clip 3 extend straight, those portions 19 might be curved into several shapes, such as an arc shape. In special case, the inserting portions 18 might be directly extended from the lateral portion 20 of a connecting portion 19, such that the clip 3 itself shows a U-shape.

In this case, the free ends of the inserting portions might be extended, crossed and then bent in parallel such that the crossed extensions can be pinched with fingers to expand the inserting portions when the end plate is detached from shaft member.

As detailed explained above, the end plate with clip of the present invention can be easily treated, since an end plate (main body 2) and a checking means (clip 3) are combined as a single member. Further, the end plate with clip can be easily attached without tool. Moreover, force for attaching is small, e.g. 7 Kg or less, and checking force is large, e.g. 30 Kg or more. Further, since a tubular supporting portion 8 to receive a shaft member is provided to the main body 2, right angle to the shaft member can be securely kept.

The connecting assembly of the present invention can function the above-mentioned technical effect of the end plate at all, and is suitable for jointing device with insulation damper for an end of rod of a control cable.

Though various preferable embodiments are described above with reference to the attached drawings, the present invention is not limited to the above embodiments, and various changes and modifications can be made without apart from scope and spirit of the invention.

What we claim is:

1. An end plate with clip comprising:

(A) a main body having a base plate with a center hole for receiving an end of a shaft, a tubular supporting portion projecting from a rim of the center hole and a projecting portion on the base plate;

the supporting portion having an inner hole for receiving a shaft end and a pair of slits at a lower portion thereof;

the pair of slits formed at both sides with respect to an axis of the main body and being parallel with the base plate and reaching the inner hole;

(B) a U-shaped clip having a holding portion to be rotatably engaged with the projecting portion on the base plate and a pair of inserting portions to be inserted into the pair of slits at free ends thereof, said inserting portions engaging with an engaging groove formed in the shaft; wherein the projecting portion is formed with another engaging groove for engaging the holding portion of the clip.

2. The end plate of claim 1 wherein the holding portion of the clip has a U-shaped form and a connecting portion connecting the pair of inserting portions, each inserting portion being made by bending a free end of a respective connecting portion back.

3. The end plate of claim 1 wherein said pair of slits in the main body are positioned adjacent an upper surface of the base plate; and a connecting portion connecting the pair of inserting portions of the clip is elastically abutted against the upper surface of the base plate.

4. The end plate of claim 1 wherein the main body has a bush for receiving the shaft; and the bush is situated under the base plate concentrically with the supporting portion.

5. The end plate of claim 4 wherein the main body and the bush are integratedly made of synthetic resin.

6. A connecting assembly comprising a shaft member having a tapered free end, an engaging groove and another supported end;

a rotary member provided on the shaft member; and an end plate with a clip;

wherein the end plate with the clip comprises:

(A) a main body having a base plate with a center hole for receiving an end of the shaft member, and a tubular supporting portion projecting from a rim of the center hole;

the supporting portion having an inner hole for receiving a shaft member end and a slit at a lower portion thereof;

the slit being parallel with the base plate and reaching the inner hole; and (B) a clip having a holding portion to be supported on the main body and an inserting portion to be inserted into the slit at a free end thereof, said inserting portion engaging with an engaging groove formed in the shaft member;

the main body of the endplate having a bushing situated under the base plate so as to be concentric with the supporting portion; and the bushing is interposed between the shaft member and the rotary member.

7. The connecting assembly of claim 6 wherein the bushing has a flange at a bottom thereof and the flange engages with a bottom end of the rotary member.

8. The connecting assembly of claim 6, wherein the rotary member is an eye-rod having a ring portion and a rod portion; and the rod portion has an end connected to a control cable.

9. The connecting assembly of claim 8 wherein a damper is interposed between an inner face of the ring portion and the shaft member.

10. An end plate with clip comprising:

(A) a main body having a base plate with a center hole for receiving an end of a shaft, and a tubular supporting portion projecting from a rim of the center hole;

the supporting portion having an inner hole for receiving a shaft end and a slit at a lower portion thereof;

the slit being parallel with the base plate and reaching the inner hole; and (B) a clip having a holding portion to be supported on the main body and an inserting portion to be inserted into the slit at a free end thereof such that the inserting portion is engaged with an engaging groove formed in the shaft, wherein the base plate is provided with a projecting portion, and the projecting portion is formed with another engaging groove for engaging with the holding portion of the clip.

* * * * *